United States Patent [19]

Koishi et al.

[11] Patent Number: 4,484,319
[45] Date of Patent: Nov. 20, 1984

[54] APPARATUS FOR LOCATING A TRACK ON DISC-LIKE OPTICAL INFORMATION CARRIERS

[75] Inventors: Kenji Koishi, Suita; Tomio Yoshida, Katano; Isao Satoh; Shunji Harigae, both of Neyagawa, all of Japan

[73] Assignee: Matsushita Electric Industrial Co., Ltd., Kadoma, Japan

[21] Appl. No.: 301,420

[22] Filed: Sep. 11, 1981

[30] Foreign Application Priority Data

Sep. 19, 1980 [JP]  Japan .................................. 55-130942
Oct. 1, 1980 [JP]  Japan .................................. 55-138165

[51] Int. Cl.$^3$ ............................................. G11B 21/10
[52] U.S. Cl. ...................................................... 369/46
[58] Field of Search ...................... 369/32, 46, 43-45

[56] References Cited

U.S. PATENT DOCUMENTS

| | | | |
|---|---|---|---|
| 3,962,721 | 6/1976 | de Hann | 369/46 |
| 3,963,862 | 6/1976 | Bouwhuis | 369/46 X |
| 4,006,293 | 2/1977 | Bouwhuis et al. | 369/46 X |
| 4,051,527 | 9/1977 | Braat | 369/46 X |
| 4,106,058 | 8/1978 | Romeas et al. | 369/32 |
| 4,135,086 | 1/1979 | Balg | 369/32 X |
| 4,268,745 | 5/1981 | Okano | 369/46 X |
| 4,305,144 | 12/1981 | Ukada | 369/46 |
| 4,363,116 | 12/1982 | Kleuters et al. | 369/32 X |
| 4,375,088 | 2/1983 | de Haan et al. | 369/44 X |

Primary Examiner—Aristotelis M. Psitos
Attorney, Agent, or Firm—Stevens, Davis, Miller & Mosher

[57] ABSTRACT

A track searching system for an optical information recording and reproducing apparatus in which a disc-like information carrier provided with concentric or spiral guide tracks of a channel-like configuration is used as an information recording and storing means and adapted to be scanned by a light beam for recording or retrieval of information. Light flux reflected by the information carrier and presenting variable distribution of light intensity is received by paired photoelectric elements. A difference signal and a sum signal derived from the output signals from the photoelectric elements or a reproduced RF signal representative of reproduced information undergo phase comparison processing, the result of which is utilized for determining the direction and number of guide tracks traversed by the scanning light beam. A desired track is searched and accessed with high accuracy at a high speed for assuring a positive and rapid information recording or retrieval at the desired track regardless of eccentricity of the information carrier, variations in the scanning speed, and the presence or absence of a recorded track.

2 Claims, 17 Drawing Figures

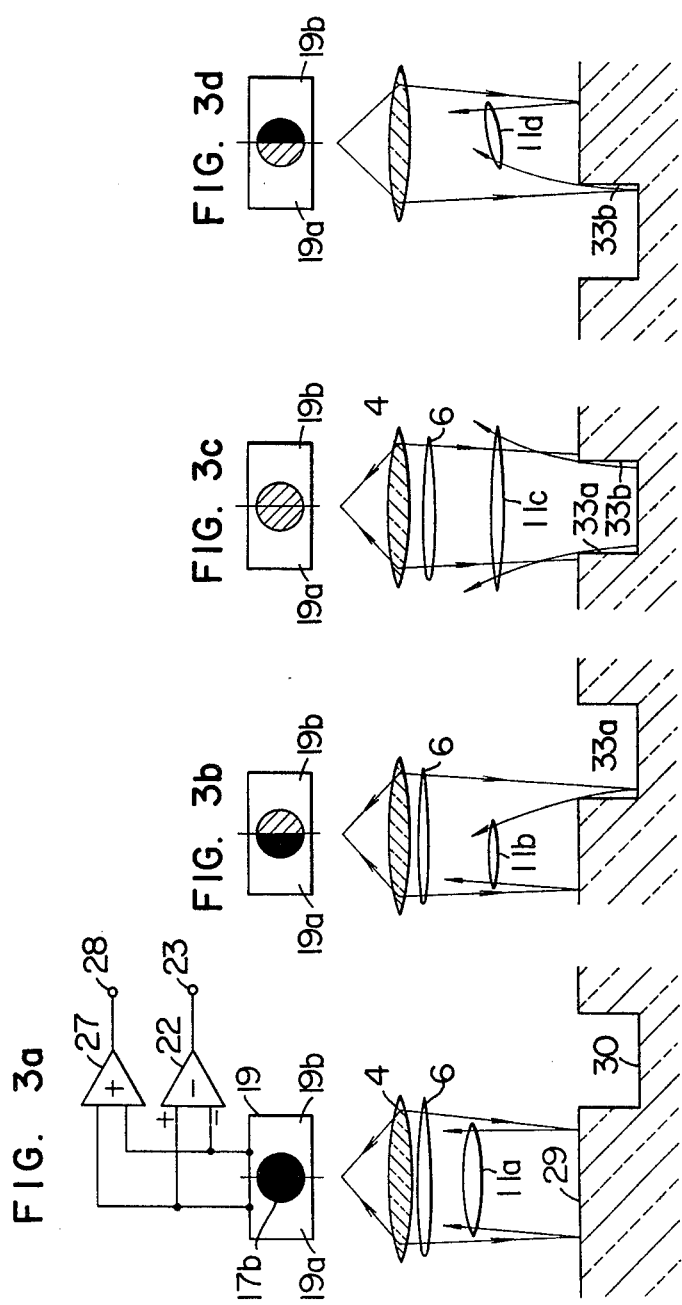

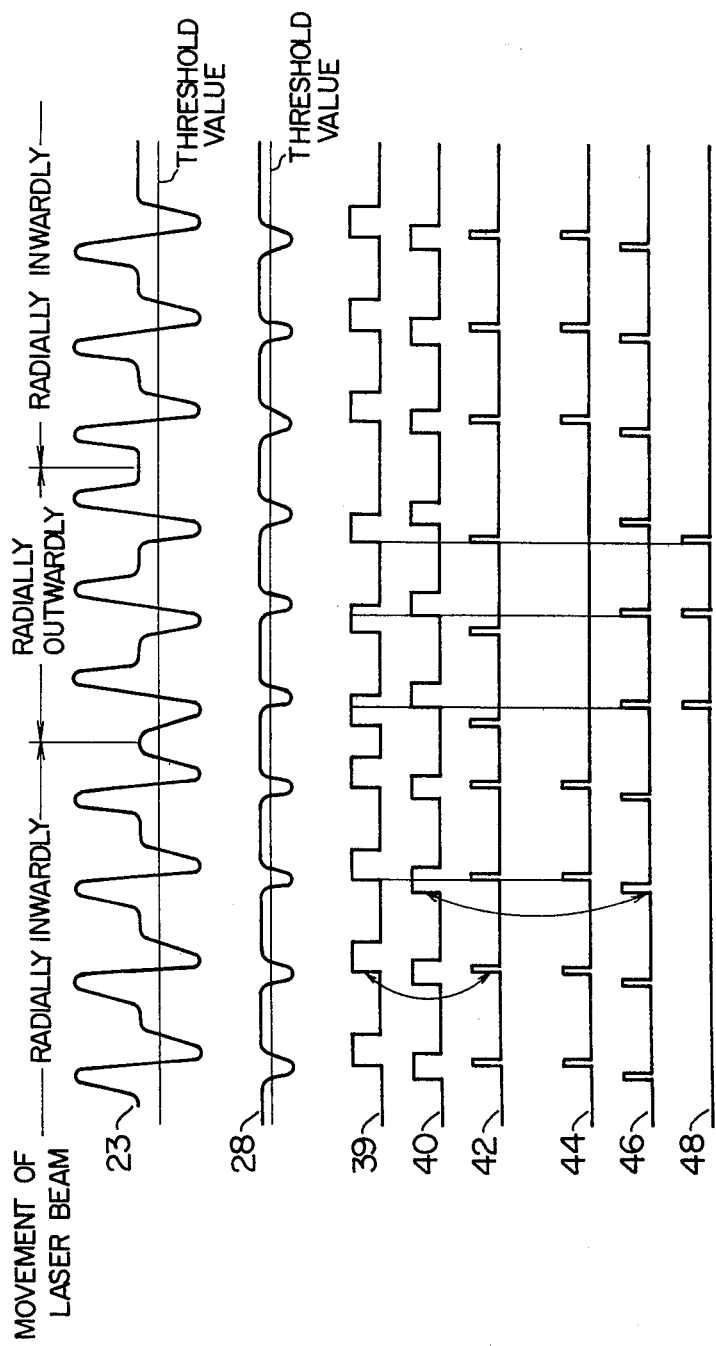

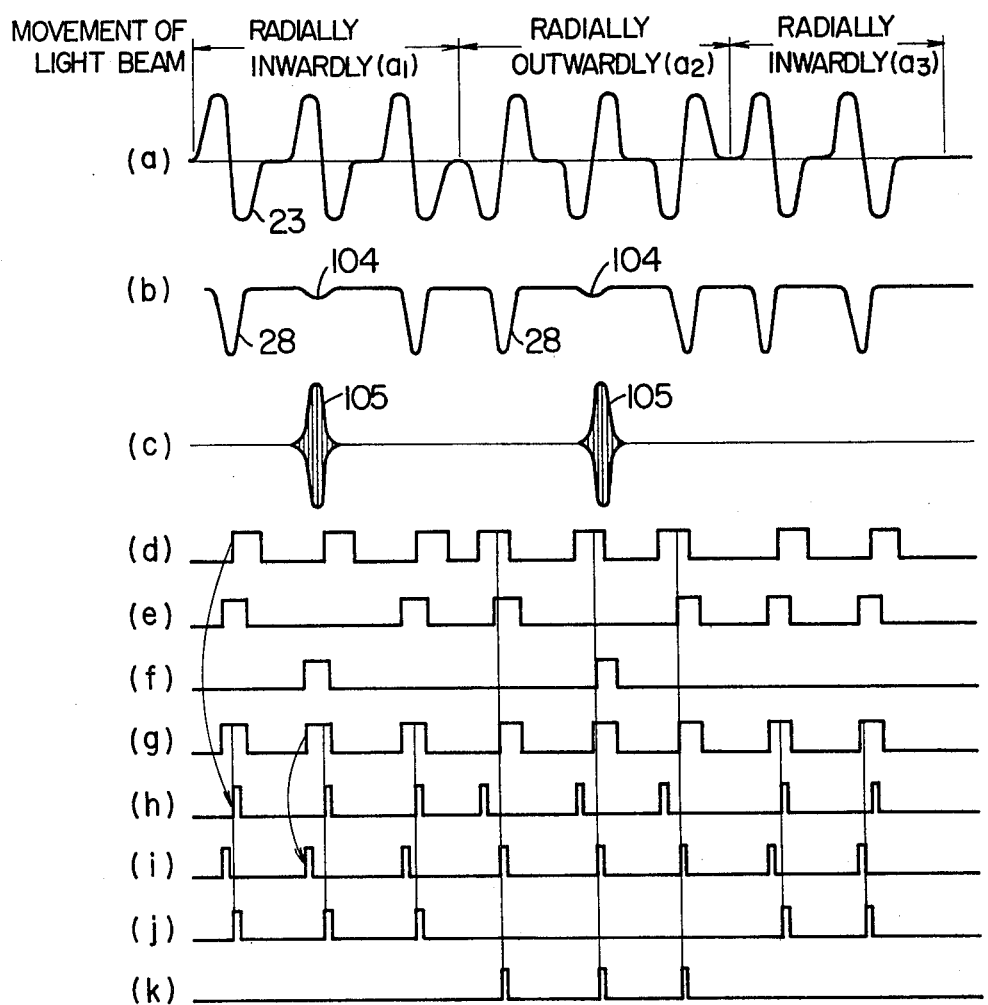

APPARATUS FOR LOCATING A TRACK ON DISC-LIKE OPTICAL INFORMATION CARRIERS

The present invention relates to an optical information recording and reproducing apparatus having a track searching or locating system.

In an optical information recording and reproducing apparatus heretofore proposed, in a recording step, a rotating disc-like information carrier having a surface deposited with a light-sensitive material by coating or evaporation is irradiated with an extremely small light spot having a diameter of 1 $\mu$m or less formed by focussing a light flux or beam emitted from a light source such as a laser or the like. By modulating the intensity of the light beam in accordance with a signal to be recorded, it is possible to record information such as video signals, digital signals or the like on the information carrier on a real time basis in terms of changes in optical characteristics such as variations in phase, refraction index, reflection factor and/or transmission factor due to roughness or uneveness of the surface of the information carrier. Reproducing of the recorded information can be achieved by detecting the variations in the optical characteristics.

With a view to attaining a high density of recording tracks while allowing discrete and partial recording or erasing, it is conceivable to provide a concentric or spiral array of guide tracks on the information carrier, whereby recording or reproduction of information is carried out on or from predetermined tracks under a tracking control which causes the fine light spot to follow the track in concerned under the guidance of the guide track.

The present invention concerns an apparatus which is capable of optically recording and/or reproducing information on or from a disc-like information carrier provided with optically discriminable guide tracks and deposited with a recording layer of a light-sensitive material, in particular, to provide an information retrieval apparatus which allows a desired storage track to be searched or accessed at a high speed by counting the number of tracks traversed by a scanning light beam to reach the desired track.

The guide track formed in the information carrier is preferably of a channel- or groove-like configuration forming ununiform flatness of the surface of the information carrier. Information is recorded in a recording medium such as an amorphous metal layer deposited on the surface of the information carrier in which the guide tracks are formed. Information may be stored in the form of holes formed through vaporization or locally blackened areas.

Discrimination of the guide track may be realized by making use of the fact that a far-visual field pattern of laser rays reflected from the guide track presents a non-uniform distribution of light intensity across the longitudinal center axis of the guide track. Such non-uniform distribution of light intensity is detected by a photoelectric detector composed of two independent photoelectric cells juxtaposed along a division boundary extending in parallel with a line tangential to the guide track. The electric signal output from the photoelectric detector or transducer is applied to a tracking controller. With such arrangement, when the information carrier is scanned by a laser beam focused onto the light-sensitive recording medium in a form of a fine spot of light, then a track traverse signal can be obtained as a difference signal between the output signals produced from the two photoelectric cells each time a track is traversed by the laser light spot. By counting the number of the track traverse signals, the number of tracks which have been traversed by the spot of laser light during the movement over the information carrier can be determined. Accordingly, by stopping operation of a means for driving the optical scanning head for searching the desired track when the counted number of the traversed tracks coincides with the reference number of tracks which have been traversed to reach a desired track, the latter can be automatically located at a high searching speed.

In general, in mounting and removing the removable information carrier on and from the apparatus it is enevitable that an eccentricity occurs on the order of several ten $\mu$m. Such eccentricity may give rise to the generation of false track traverse signals in the case of the optical information carrier in which the tracks are formed with a pitch of 1 $\mu$m to 2 $\mu$m, particularly when the scanning speed is low as compared with the rotating speed of the information carrier as in the start and end phases of the track scanning cycle. Obviously, a greater eccentricity involves a greater error in the counted number of the traversed tracks, to a serious disadvantage.

An object of the present invention is to provide a track searching or locating system for an optical information recording/reproducing apparatus which is immune to the disadvantage mentioned above and capable of counting, accurately the number of tracks irrespective of the existence of the eccentricity of the information carrier, to thereby enhance the speed of the track searching operation.

Since a track having information recorded thereon exhibits a reflection factor which differs from that of an unrecorded track, the output signal produced from the photoelectric detector upon traversal of the recorded track is naturally different from the detector signal which is produced upon traversal of the unrecorded track.

Accordingly, another object of the present invention is to provide a track searching or locating system for an optical information recording/reproducing apparatus which is capable of locating the desired track with an enhanced reliability regardless of the presence of both recorded and unrecorded tracks to be traversed.

According to a feature of the present invention, a difference signal and a sum signal derived from two output signals produced by a two-element photoelectric detector or a reproduced RF signal representative of reproduced information are compared with each other in respect of phase for the purpose of determining definitely the direction in which the tracks formed in the information carrier are traversed by a scanning light beam and counting accurately the number of tracks which have been traversed in order to reach the desired track, while suppressing influences of variations in the scanning speed, presence of the recorded tracks and others. The apparatus according to the invention allows the information recording and/or retrieval at a high speed with an improved reliability without resorting to the use of position detecting or indexing means such as a linear encoder or the like.

The present invention will be apparent from the following detailed description taken in conjunction with the accompanying drawings, in which:

FIGS. 3a to 3d illustrate distributions of light quantity over a photoelectric detector which are brought about by a laser beam reflected from a channel-like guide track at different locations;

FIG. 6 shows waveforms of signals produced at various points of the signal processing circuit shown in FIG. 5;

FIG. 11, including (a) through (k), shows waveforms of signals produced at various points of the signal processing circuit shown in FIG. 10.

In the following, the invention will be described in detail in conjunction with examplary embodiments.

Figure 1:
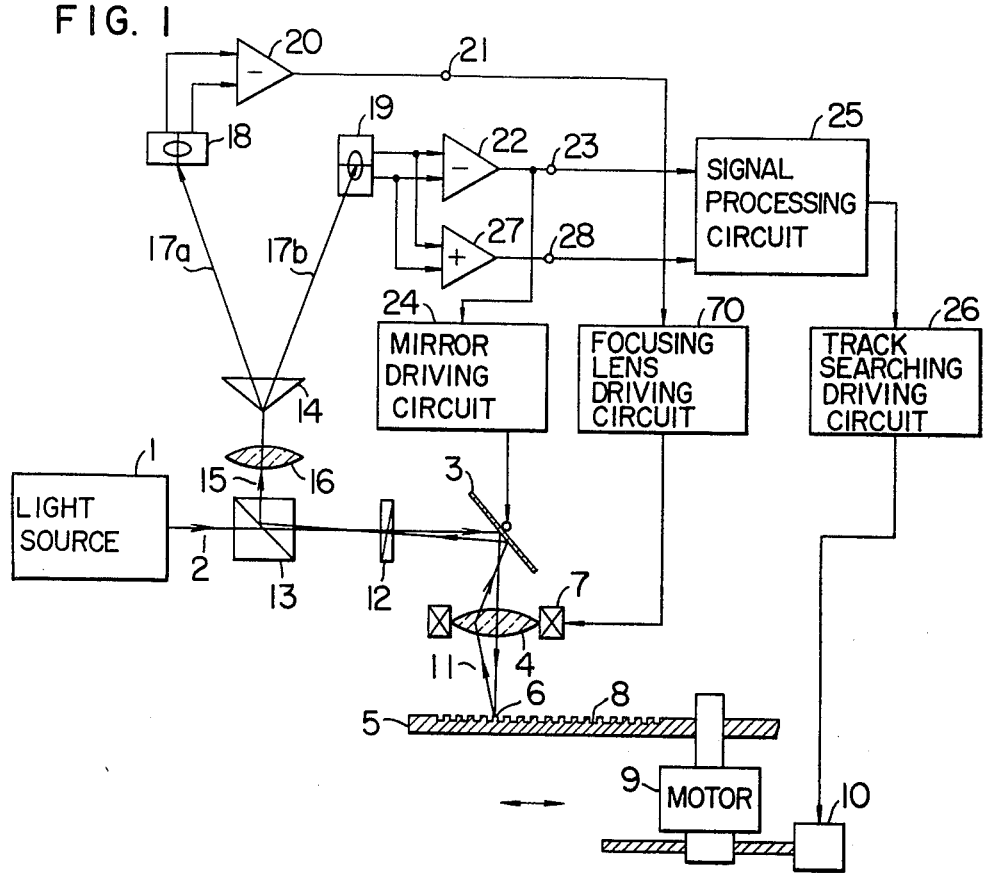
FIG. 1 shows schematically a general arrangement of an optical recording and reproducing apparatus according to an embodiment of the invention.

Referring to FIG. 1 which shows schematically a general arrangement of a track searching system of an optical information recording and/or reproducing apparatus for recording and/or reproducing information or data implemented according to an embodiment of the present invention. A laser beam 2 emitted from a laser light source 1 is varied in a direction (i.e. deflected) by a tracking mirror 3 and converged onto a disc-like information carrier 5 through a focusing lens 4 in a form of a fine (i.e. extremely small) light spot 6 of about 1 μm in diameter. There is provided in association with the focusing lens 4 a driving unit 7 which may be composed of a voice coil or the like and serves to cause the focusing lens 4 to be finely moved vertically (as viewed in FIG. 1) in accordance with vibrations or fluctuations of the disc-like information carrier 5 relative to a fixed horizontal reference plane (as viewed in FIG. 1), so that the fine light spot 6 is projected onto the information carrier 5 in the properly focused state regardless of fluctuations thereof.

The information carrier or disc 5 provided previously with guide tracks 8 is adapted to be rotated at a high speed by means of an electric motor 9 and additionally adapted to be displaced in the radial direction of the carrier 5 at a high speed by means of a track locating or searching scanning mechanism 10 which may be constituted by a pulse motor and a lead screw or the like combination. In this connection, it should be noted that, although the information carrier 5 and the rotating motor 9 are linearly displaced by the track locating scanning mechanism 10 in the case of the exemplary embodiment shown in FIG. 1, it is equally possible to displace in the radial direction the whole optical system inclusive of the focusing lens 4 for searching the desired track, while the information carrier 5 and the motor 9 are stationary.

A reflected laser beam 11 reflected from the information carrier 5 is, after having passed through the lens 4 and undergone reflection by the mirror 3, transmitted through a quarterwave ($\frac{1}{4}-\lambda$) plate 12 and split by a polarized light beam splitter 13. The beam 15 split by the beam splitter 13 is transmitted through a lens 16 to impinge on a vertex of a biprism 14, whereby the split beam 15 is divided into halved beams 17a and 17b. The halved beam 17a impinges on a photoelectric detector 18 for detecting the focusing state, while the halved beam 17b is received by another photoelectric detector 19 for detecting the tracking state, as will hereinafter be described in detail. The beam 17a is moved to the right and left (as viewed in FIG. 1) on the light receiving surface of the photoelectric detector 18 in accordance with vertical fluctuations of the surface of the disc-like information carrier 5. The photoelectric detector 18 has a right-hand photoelectric cell and a left-hand photoelectric cell. The outputs of these cells are coupled to two inputs of a differential amplifier 20, respectively. Thus, the output signal 21 from the differential amplifier 20 represents an error in the focused state of the scanning beam 2. The focus error signal 21 is applied to the focusing lens driving circuit 70 to thereby move the focusing or converging lens 4 in the vertical direction so that the scanning beam 2 is properly focused on the information carrier 5.

On the other hand, there may occur such phenomenon in which the fine light spot 6 is displaced transversely of the guide track 8 formed in the disc-like information carrier 5 due to possible eccentricity of the latter. In this case, distribution of light quantity of the halved beam 17b produced from the biprism 14 and projected on to the photoelectric tracking detector 19 undergoes variation (i.e. becomes non-uniform) along the vertical axis of the detector 19 (as viewed in FIG. 1). In this connection, the photoelectric detector 19 is composed of an upper cell and a lower cell (as viewed in FIG. 1) arranged so as to correspond to track portions bisected by the longitudinal center axis of the guide track 8, wherein the outputs of the upper and the lower cells are coupled to two inputs of a second differential amplifier 22. Thus, a difference signal 23 outputted from the differential amplifier 22 represents an error in the tracking of the fine light spot 6 along the track 8 due to eccentricity thereof or of the information carrier 5. The tracking error signal 23 thus derived is then applied to a tracking mirror driving circuit 24 to correspondingly vary the angle of inclination of the tracking mirror 3 so that the focused fine light spot 6 may follow accurately the guide track 8 formed in the disc-like information carrier 5. In FIG. 1, a reference numeral 25 denotes a signal processing circuit which will hereinafter be described in detail referring to FIG. 5. This signal processing circuit 25 is adapted to prepare a track traverse pulse and a track traversing direction signal both of which are applied to a track searching or locating driving circuit 26 which in turn serves to control the track searching or locating mechanism so that the fine light spot 6 is moved to a desired track position. Reference numeral 27 denotes a summing amplifier which serves to produce a sum signal 28 on the basis of the two output signals from the photoelectric tracking detector 19 described above. The sum signal 28 is also applied to the input of the signal processing circuit 25.

Figure 2:
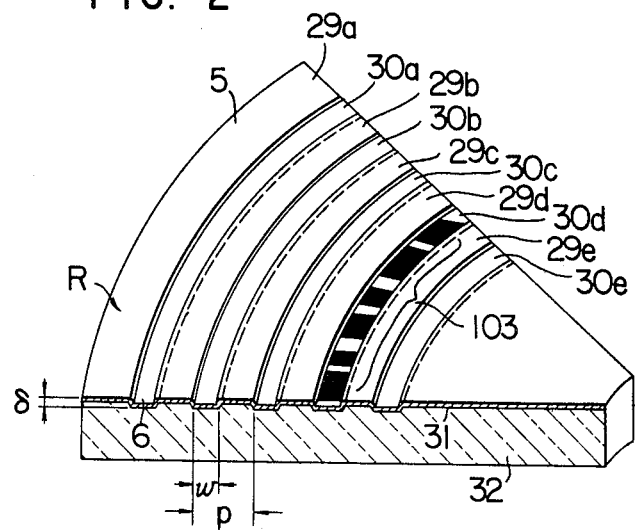
FIG. 2 is a perspective view to show fragmentally a structure of an information carrier.

Referring to FIG. 2 which shows in a fragmental sectional view a structure of the disc-like information carrier 5 designed to be used in the optical information recording/reproducing apparatus according to the invention. There are formed on the surface R of the information carrier 5 channel-or groove-like guide tracks 30a to 30e (in FIG. 1, shown at 8) in a concentric or spiral pattern with a pitch P. The width and depth of the track are represented by $\omega$ and $\delta$, respectively. Numerals 29a to 29e denote flat portions or platforms extending between the adjacent guide tracks. A light-sensitive recording material is deposited on the whole surface R of a substrate 32 through evaporation and constitutes a recording layer 31. The laser beam 2 may be converged on the surface R in the form of the fine or minute light spot 6 by irradiating the laser beam 2 from the rear side of the substrate 32 to record information on the light-sensitive layer 31. A state of record in the channel-like track is illustrated at 103 in FIG. 2. In this exemplary case, those areas shown as blackened areas of the recording material since the light does not transmit therethrough and exhibiting an increased reflection factor represent recorded information. Of cource, the recording of information is made on the bottom of the guide tracks 30a to 30e. For numerical examples of the width $\omega$, pitch P and the depth $\delta$ of the guide track, they may be dimensioned such that $\omega = 0.6$ $\mu$m, P=1.6 $\mu$m and $\delta \approx \lambda/8$ n, where $\lambda$ represents the wavelength of the laser light, and n represents refractive index of the substrate 32.

FIGS. 3a to 3d illustrate in more detail the principle of detecting the tracking error which is possibly brought about when the groove- or channel-like track 30 of the information carrier 5 is irradiated with the fine light spot 6. These FIGS. 3a to 3d show a section of a track taken along the radial direction of the information carrier 5. The photoelectric tracking detector 19 is constituted by a pair of photoelectric cells 19a and 19b which are disposed functionally, in juxtaposition across the longitudinal center axis of the track 30. More particularly, it is assumed that the photoelectric cell 19a is associated with the radially outer half of the track 30 with reference to the longitudinal center axis thereof, while the photoelectric cell 19b is associated with the radially inner half of the track 30. The reflected laser rays 11a and 11b from the information carrier 5 are projected onto the photoelectric tracking detector 19 in a form of the light spot 17b (i.e. the halved beam 17b shown in FIG. 1) in which blackened and hatched areas represent difference in the distribution of incident light quantity. In the case of the tracking state illustrated in FIG. 3a, the fine light spot 6 of the scanning laser beam 2 is located on the flat portion 29 extending between the adjacent guide tracks formed in the information carrier 5. In this case, the incident light spot 6 undergoes uniform reflection as indicated by 11a and impinges onto the photoelectric tracking detector 19 in the uniform distribution of light quantity, resulting in that the output signal from the differential amplifier 22 is equal to zero. In other words, the tracking error signal 23 is also zero.

In the state illustrated in FIG. 3b, the incident fine light spot 6 covers partially the radially outer edge portion 33a of the channel-like guide track 30. When the depth $\delta$ of the track 30 corresponds to about $\pi/4$ in terms of phase of the laser beam, the laser ray reflected from the track 30a at the radially outer edge portion thereof is diffracted radially outwardly, resulting in that the photoelectric cell 19a is irradiated more intensively, while the photoelectric cell 19b is irradiated less intensively. As the consequence, the output signal 23 from the differential amplifier 22 becomes positive when the output signals from the photoelectric cells 19a and 19b are applied, respectively, to the possitive and the negative inputs of the differential amplifier 22.

In the state illustrated in FIG. 3c, the incident fine light spot 6 is properly centered on the channel-like guide track 30. In this case, because the fine light spot 6 covers both edge portions 33a and 33b of the channel-like track, the laser rays reflected at these portions are diffracted outwardly from the aperture of the focusing lens 4 and a portion of the light quantity is lost. As the consequence, although the distribution of light quantity is uniform over both the photoelectric cells 19a and 19b, the total quantity of incident light on the photoelectric cells 19a and 19b is reduced as compared with the cases illustrated in FIGS. 3a, 3b and 3d. The difference signal 23 produced from the differential amplifier 22 is zero as in the case of the tracking condition illustrated in FIG. 3a. However, the sum signal 28 produced from the summing amplifier 27 and representing the sum of the output signals from the photoelectric cells 19a and 19b has a smaller amplitude than that of the sum signals derived in the irradiation states illustrated in FIGS. 3a, 3b and 3d.

FIG. 3d illustrates the state in which the fine light spot 6 covers partially a radially inner edge portion 33b of the track 30 in contrast to the case described above in conjunction with FIG. 3b. In this case, the laser rays 11d reflected at the radially inner track edge portion are diffracted radially inwardly, resulting in that the quantity of light impinging onto the photoelectric cell 19b is correspondingly increased. As the consequence, the difference signal 23 produced by the differential amplifier 22 takes a negative value.

Figure 4A:
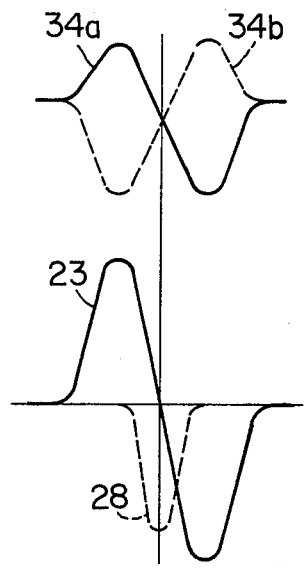
FIGS. 4a and 4b illustrate signal waveforms of output signals from the photoelectric detector together with a difference signal and a sum signal derived from the output signals.
Figure 4B:
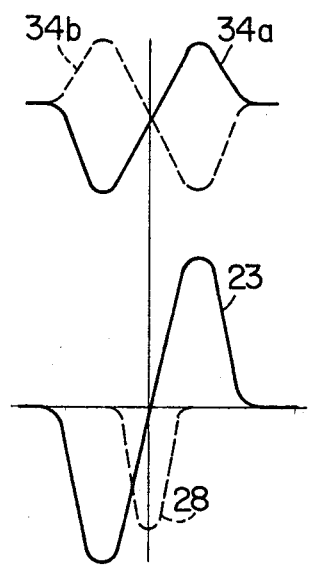

FIGS. 4a and 4b show signal waveforms of the sum signal 28 and the difference signal 23 of the output signals 34a and 34b which are produced, respectively, from the photoelectric cells 19a and 19b of the photoelectric tracking detector 19 when the fine light spot 6 traverses the single guide track upon radial displacement of the scanning laser beam. The signal waveforms shown in FIGS. 4a are depicted on the assumption that the scanning is effected radially inwardly, while the signal waveforms shown in FIG. 4b are plotted for the case in which the scanning is effected radially outwardly.

In FIGS. 4a and 4b, the peak of the sum signal 28 coincides with the zero-crossing point of the difference signal 23, which is independent from the scanning direction, as is obvious from the above elucidation made by referring to FIGS. 3a to 3d. When the waveforms of the sum signal 28 and the difference signal 23 are compared with each other in respect to the phase, it can be seen that when the scanning beam traverses the channel-like guide track 30 in the radially inward direction, the sum signal 28 is advanced in phase relative to the negative polarity component of the difference signal 23, as is shown in FIG. 4a. On the other hand, when the scanning laser beam 2 traverses the channel-like track in the radially outward direction, the sum signal 28 is delayed relative to the negative polarity component of the difference signal 23, as is shown in FIG. 4b. In this way, it is easily possible to detect the direction in which the channel-like track is traversed by the scanning laser beam by comparing the phase relationship between the sum signal 28 and the negative polarity component of the difference signal 23. Besides, by virtue of the fact that the peak of the sum signal 28 and the zero-cross point of the difference signal 23 coincide invariably with each other regardless of variations in the reflection factor or the like characteristic quantities of the information carrier 5 and hence in the quantity of reflected laser light 11, the detection of the traversing direction of the scanning laser beam can be accomplished in a very stable manner with a high reliability.

Figure 5:
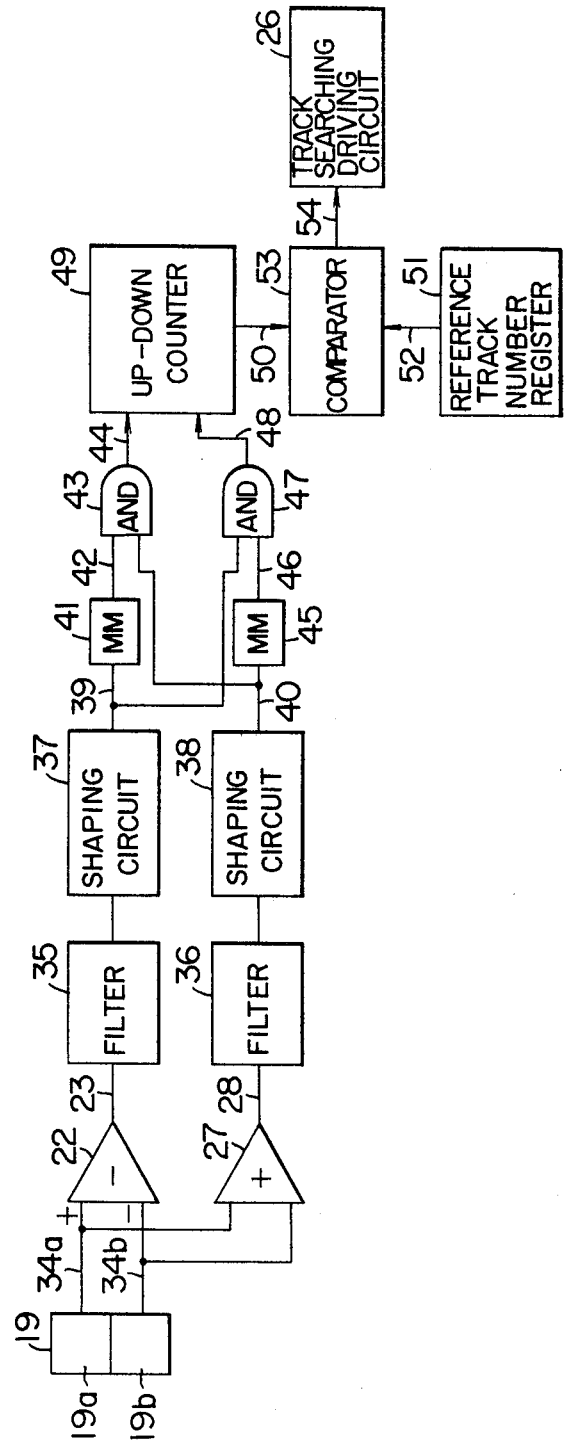
FIG. 5 shows a circuit diagram of a signal processing circuit for counting the number of tracks traversed by a scanning laser beam.

FIG. 5 shows in a block diagram the signal processing circuit denoted generally by the reference numeral 25 in FIG. 1. This circuit serves to locate a given track by counting number of the tracks which have been traversed by the scanning laser beam.

Now, the signal processing circuit will be described in detail referring also to FIG. 6 which shows waveforms of signals produced by circuit blocks shown in FIG. 5. Referring to FIG. 5, the output signals 34a and 34b from the photoelectric cells 19a and 19b which constitute the photoelectric tracking detector 19 are supplied to the differential amplifier 22 and at the same time to the summing amplifier 27 to thereby derive the difference signal 23 and the sum signal 28, respectively. These signals 23 and 28 are fed to filters 35 and 36, respectively, to eliminate unwanted signal components such as instrumental noise and the like and subsequently supplied to shaping circuits 37 and 38, respectively, to be shaped into rectangular waveforms 39 and 40 (refer to FIG. 6). It should be noted that the shaped difference signal 39 and the shaped sum signal 40 contain no components of negative polarity which have been sliced away with reference to a predetermined threshold level. The shaped difference signal 39 is applied to the input of a monostable multiviblator 41 which is then triggered by the rising edge of the difference signal pulse 39 to thereby produce a needle pulse difference signal 42. This pulse signal 42 is applied to an AND gate 43 together with the shaped sum signal 40. The logical product output from the AND gate 43 is a pulse signal 44 (refer to FIG. 6) which represents the radially inward traversing of the scanning laser beam and will hereinafter be referred to as the radially inward traverse pulse signal 44. On the other hand, a mono-stable multivibrator 45 is triggered by the rising edge of the shaped sum signal pulse 40 to produce a needle pulse sum signal 46 (FIG. 6), which is then applied to a second AND gate 47 together with the shaped difference signal 39. The logical product output from the AND gate 47 is then a pulse signal 48 which represents the radially outward traversing of the scanning laser beam and which will hereinafter be referred to as the radially outward traverse pulse signal 48.

The total number of the radially inward traverse pulses 44 and the total number of the radially outward traverse pulses 48 represent, respectively, the number of tracks traversed by the scanning laser beam in the radially inward direction of the information carrier and the number of tracks traversed in the radially outward direction, even when a same track is traversed several times by the laser beam with the traversing direction being reversed from the radially inward to the radially outward direction and vice versa, as will be described hereinafter.

In view of the fact described above, the radially inward traverse pulse signal 44 is fed to an up-count input of an up-down counter 49, while the radially outward traverse pulse signal 48 is fed to a down-count input of the up-down counter 49. Then, the output count pulse signal appearing at the output 50 of the counter 49 represents the net number of tracks which have been traversed by the laser beam in the radially inward direction. The output count signal 50 from the up-down counter 49 is supplied to one input of a comparator 53 which has the other input supplied with a desired track traversal number signal 52 representing a desired number of tracks to be traversed and placed in a track traversal number setting register 51. When the signal 50 coincides with the signal 52, the comparator 52 produces at the output thereof a track searching stop signal 54 which is supplied to the track searching drive circuit 26 to stop the track searching or locating operation.

Figure 7A:
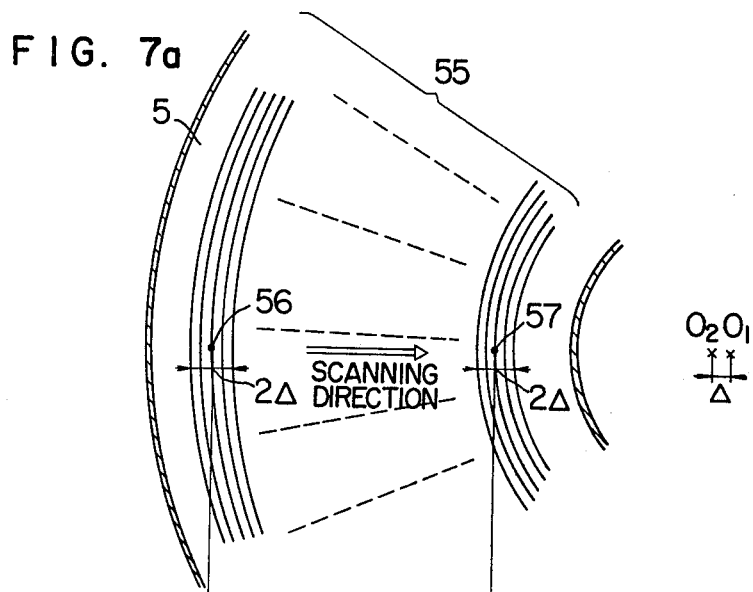
FIGS. 7a and 7b illustrate the influence of eccentricity of the information carrier to a track searching or locating operation.
Figure 7B:
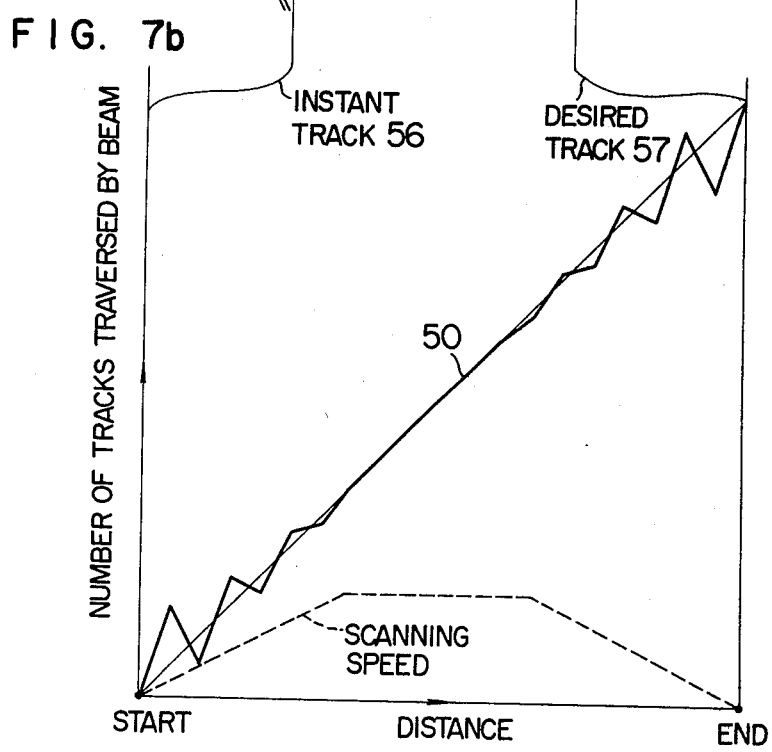

FIGS. 7a and 7b illustrate counting of the traversed tracks and influences ascribable to track eccentricity in the operation for searching or locating a given desired track.

Referring to FIG. 7a, it is assumed that there exists an eccentricity $\Delta$ between the center $O_1$ of the information carrier 5 and the rotational center $O_2$ of the motor 9 (refer to FIG. 1). If the tracking control described above was not adopted, the fine light spot located stationarily on a track 56 will traverse the guide tracks located within a range of $\pm\Delta$ due to the eccentricity $\Delta$, when the information carrier is rotated. When the track searching or locating operation is initiated starting from the track 56 toward a desired or end track 57 by actuating the track searching mechanism 10, the searching speed is first accelerated to a constant speed. After the track traversing operation has been performed at the constant speed, the track searching mechanism 10 is braked, whereby the searching speed is decreased so that the fine light spot stops at the desired track 57. A profile of such track searching speed is represented by a broken line curve in FIG. 7a. In this connection, it is to be noted that, in regions adjacent to the starting point (56) and the end point (57), the track searching speed is low relative to the rotating speed of the information carrier 5, so that one and the same track lying in these regions is traversed several times by the light spot due to the eccentricity of the information carrier. As the consequence, the difference signal 23 (refer to FIG. 6) is inverted in phase, giving rise to concurrent generation of both the radially inward traverse pulses 44 and the radially outward traverse pulses 48. A difference in number between the traverse pulses 44 and 48 represents the net number of the tracks in each of the regions located adjacent to the starting point (56) and the end point (57). Accordingly, by using the up-down counter 49 for counting the number of the tracks traversed by the light spot in the manner described above, the desired track 57 can be positively searched by stopping the searching operation when the count output signal 50 produced from the up-down counter 49 coincides with the number of tracks which are to be traversed until the desired or end track has been attained.

As will be appreciated from the foregoing description, the track searching apparatus according to the invention allows the number of tracks traversed by the scanning laser beam to be counted accurately regardless of an eccentricity of large or small magnitude and thus can assure a high speed track searching operation. Further, by virtue of the phase inversion of the difference signal in dependence on the track traversing direction, decreasing of the sum signal upon proper focusing of the laser beam on the track and the coincidence between the peak of the sum signal and the phase of the zero-cross point of the difference signal independently from variations in the reflection factor of the information carrier, an improved track searching or locating operation can be accomplished at a high speed.

Figure 8:
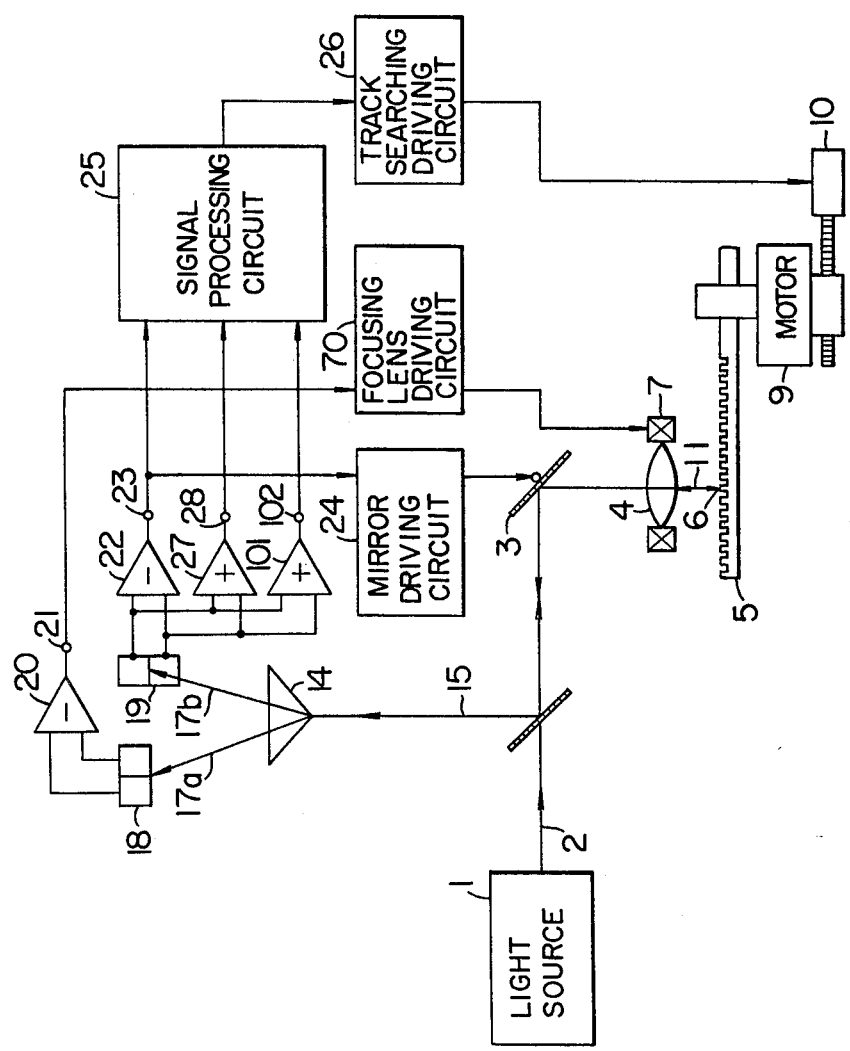
FIG. 8 shows a general arrangement of the optical recording and reproducing apparatus according to another embodiment of the present invention in which a reproduced RF signal is made use of in searching or locating a desired track.

FIG. 8 shows in a block diagram a general arrangement of a track searching or indexing apparatus according to another exemplary embodiment of the invention. This arrangement of allows detection of the track traverse signal with an improved reliability when the recorded tracks are traversed. Following description is directed mainly to the arrangement which from the one shown in FIG. 1. The optical signal picked-up from the disc-like information carrier 5 is detected by the photoelectric detector 19. The output signal from the detector 19 is applied to a high-frequency pre-amplifier 101 which produces a reproduced RF signal 102.

Figure 9A:
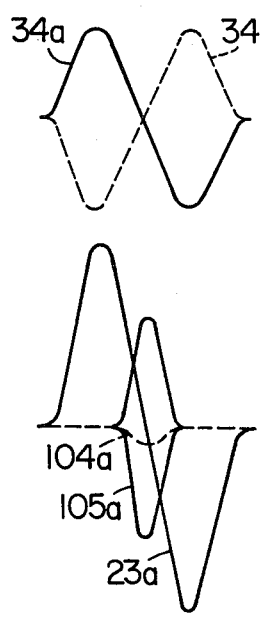
FIGS. 9a and 9b illustrate waveforms of signals produced from the photoelectric detector upon traversal of a recorded channel-like guide track by a light spot.
Figure 9B:
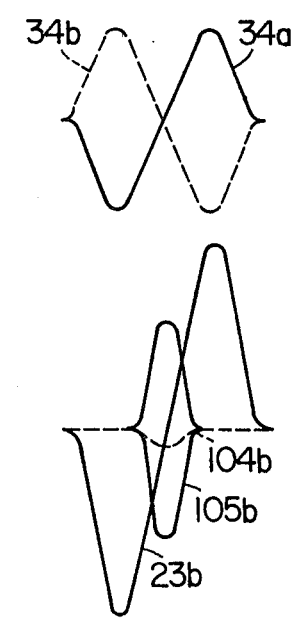

FIGS. 9a and 9b illustrate waveforms of a tracking difference signal, a tracking sum signal and a reproduced RF signal produced when an optically recorded track such as the one denoted by 103 in FIG. 2 is traversed by the light spot of the laser beam. It should be recalled that description made hereinbefore in conjunction with FIGS. 4a and 4b applies the track searching operation in which no information has been optically recorded in the light-sensitive layer of the information carrier disc along the channel-like tracks.

When the light-sensitive material of the channel-like guide track is exposed to a recording irradiation, the exposed portion exhibits an increased reflection factor. As a consequence, not only the amplitude of the output signals from the photoelectric detectors is increased correspondingly, but also amplitude of the difference signals 23a and 23b is increased. On the other hand, the amplitude of the sum signals 104a, 104b derived at the center of the channel (groove) are not decreased (or the level is not lowered) so remarkably as the sum signal 28 described hereinbefore in conjunction with FIGS. 4a and 4b, as is indicated by 104a and 104b in FIGS. 9a and 9b, because the reflection factor in the channel-like track is increased, whereby the quantity of light impinging onto the associated photoelectric detectors is increased, notwithstanding diffraction of the reflected rays as illustrated in FIG. 3c. Because the detection of the traversing direction becomes instable when the amplitude of the sum output signals is small as indicated by broken curves 104a and 104b, the reproduced RF signal should preferably be employed in place of the sum signal (104a; 104b) in the case of the recorded track. Waveforms of the reproduced RF signal are indicated by solid line curves 105a and 105b in FIGS. 9a and 9b. Since the recording is carried out by projecting the light spot at and along the channel-like track, the phase of the reproduced signal waveform (105a, 105b) coincides with that of the sum signal waveform (104a, 104b) in the tracking direction. In this manner, in the case of the recorded track, the direction in which the light spot traverses the tracks is detected by comparing the phase of the reproduced signal waveform (105a, 105b) with the phase of negative polarity portion of the difference signal. By the way, FIG. 9a illustrates the signal waveforms concerned on the assumption that the light spot traverses the recorded tracks in the radially inward direction as in the case of FIG. 4a, while the signal waveforms shown in FIG. 9b is depicted for the track scanning in the radially outward direction, as in the case of FIG. 4b.

It is thus apparent that the track traversing direction of the scanning laser beam can be easily determined by detecting the difference in phase between the sum signal and the difference signal for the unrecorded track portion on one hand and the difference in phase between the reproduced signal and the difference signal for the recorded track portion on the other hand. In other words, a determination of the track traversing direction as well as the counting of the number of tracks traversed by the scanning laser beam can be accomplished regardless of whether information is recorded or not on the tracks.

Figure 10:
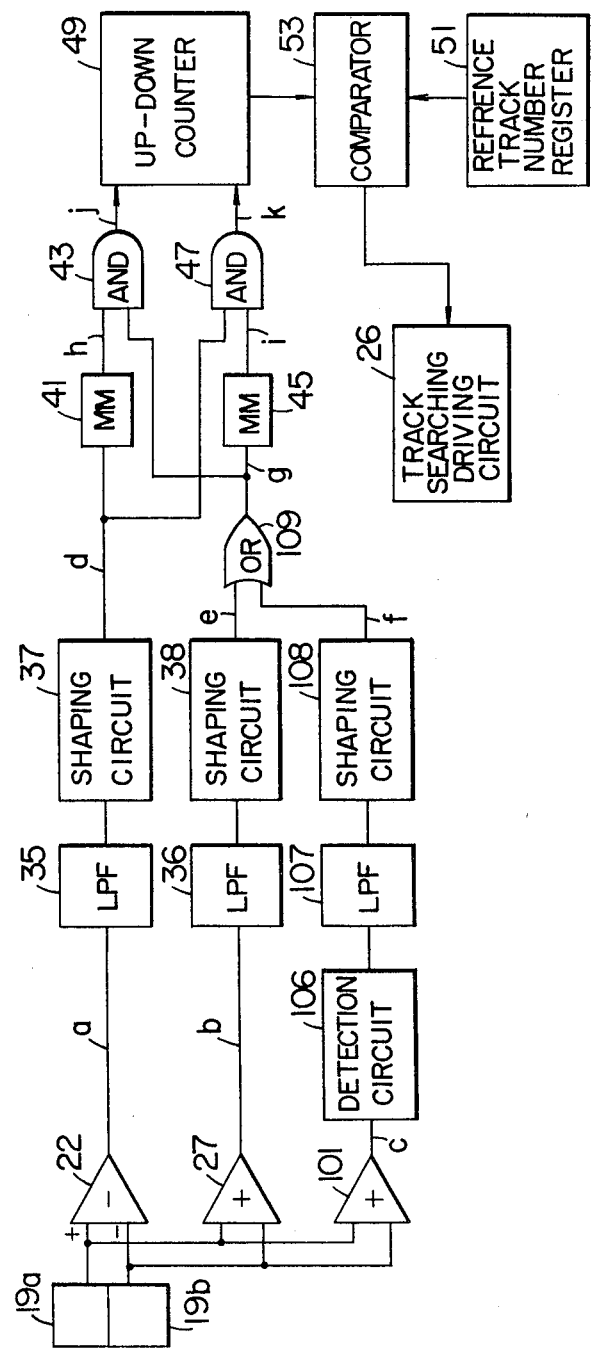
FIG. 10 shows in block diagram form a signal processing circuit which is capable of counting the tracks traversed by the light spot, even when information is recorded on the tracks.

FIG. 10 shows in a block diagram a circuit configuration of the signal processing circuit denoted by a reference numeral 25 in FIG. 8, and FIG. 11 shows waveforms a to k of signals produced at various points a to k of the circuit 25 on a same time scale.

Referring to the waveform shown in FIG. 11 at a which represents the difference signal output from the differential pre-amplifier 22, the laser beam or light spot is moved radially inwardly during a period $a_1$, while the light spot is moved radially outwardly during an interval $a_2$. The waveform of the sum signal output from the summing pre-amplifier is shown at b in FIG. 11, in which steep waveforms 28 correspond to the unrecorded track portions, while gentle waveforms 104 correspond to the recorded track portions. The reproduced signal waveform is illustrated at c in FIG. 11. It is to be noted that the recorded track portions are detected at the positions 105. In FIG. 10, a reference numeral 101 denotes the high-frequency pre-amplifier for amplifying the reproduced or picked-up signal.

The difference signal a is applied to a low-pass filter 35 for passing only the detection signal representative of the traversal of channel-like guide track by eliminating other instrumental or the like noise components. The output signal from the low-pass filter 35 is fed to a shaping circuit 37 through which only the negative component of the difference signal 23 is outputted as a shaped pulse signal (refer to waveform d in FIG. 11). The sum signal b is also fed to a low-pass filter 36 and then to a shaping circuit 38 to be shaped into a pulse signal d shown in FIG. 11. On the other hand, the reproduced signal c is supplied to a detection circuit 106 to undergo an envelope detection. The output signal from the detector 106 is passed through a low-pass filter 107 and supplied to a shaping circuit 108 to be shaped into a pulse signal of waveform f shown in FIG. 11. The sum signal pulse e and the reproduced signal pulse f are applied to the inputs of an OR circuit 109. The logical sum pulse output (refer to FIG. 11 at g) from the OR circuit 109 represents the longitudinal center of the channel-like track regardless of presence or absence of recorded information. The difference signal pulse d and the logical sum pulse g are applied to mono-stable multivibrators 41 and 45, respectively, which are triggered by the rising edges of the respective input pulses to thereby produce output pulses each of a short pulse width.

The output pulse h from the mono-stable multivibrator 41 triggered by the rising edge of the difference signal pulse is subjected to phase comparison with the logical sum pulse g through an AND circuit 43. When the high levels of both pulses coincide with each other, the radially inward traverse pulse shown in FIG. 11 at j is produced. On the other hand, the output pulse i from the mono-stable multivibrator 45 triggered by the rising edge of the logical sum pulse g undergoes phase comparison with the difference signal pulse d. When the high levels of both pulses coincide with each other, the radially outward traverse pulse shown in FIG. 11 at k is produced.

The radially inward traverse pulses j are applied to an up-count clock terminal of an up-down counter 49, while the radially outward traverse pulses k are applied to a down-count clock terminal of the up-down counter 49. Then, a signal appears at the count output of the up-down counter 49 representative of the net number of the tracks traversed by the light spot in the radially inward direction. For the same reason as mentioned hereinbefore in conjunction with the first exemplary embodiment of the invention, it is possible to determine the number of the traversed tracks with high accuracy even when the light spot is caused to traverse by repeated inversion of traversing direction a same track due to eccentricity of the disc-like information carrier.

What is claimed is:

1. A track locating apparatus for an optical information recording and reproducing system, in which a light spot is radiated on a disc-like information carrier having optically detectable guide tracks, and a reflected light beam from a guide track is received by a photoelectric detector having two light receiving sections divided by a division boundary extending in a direction corresponding to a tangent of the guide tracks, said track locating apparatus comprising:
   a differential amplifier connected to said photoelectric detector for producing a difference signal between output signals of said two light receiving sections of said photoelectric detector;
   a summing amplifier connected to said photoelectric detector for producing a sum signal of said output signals of said two light receiving sections;
   a high-frequency pre-amplifier connected to said photoelectric detector for producing a reproduced signal;
   detecting means connected to said differential amplifier, said summing amplifier and said high-frequency pre-amplifier for detecting a direction in which said light spot traverses the guide track, said detecting means comparing a phase of said difference signal with a phase of one of said sum signal and said reproduced signal thereby to produce a direction signal indicating whether said light spot traversed a guide track radially inwardly or outwardly;
   said detecting means including means for shaping said sum signal, said difference signal and said reproduced signal to shaped pulses;
   means for transforming a pulse shaped difference signal to a narrow pulse difference signal representing the leading edge of said pulse shaped difference signal;
   means for transforming at least one of a pulse shaped sum signal and a pulse shaped reproduced signal to a narrow pulse representing the leading edge of the transformed pulse shaped signal;
   a first AND circuit for comparing a phase of said narrow pulse difference signal with a phase of one of a pulse shaped sum signal and a pulse shaped reproduced signal, said first AND circuit producing said direction signal indicating that said light spot has traversed the guide track radially inwardly when the compared phases are substantially coincident with each other;
   a second AND circuit for comparing a phase of a pulse shaped difference signal with a phase of a transformed narrow pulse representing a leading edge of one of said pulse shaped sum signal and said pulse shaped reproduced signal, said second AND circuit producing said direction signal indicating that said light spot has traversed the guide track radially outwardly when the compared phases are substantially coincident with each other; and
   counting means responsive to said direction signal from said detecting means for counting said direction signal upwardly or downwardly depending on the direction indicated by said direction signal thereby to count a net number of guide tracks traversed by said light spot, said counting means including an up-down counter having two clock inputs, one of said clock inputs being supplied with said direction signal indicative of the inward traverse supplied from said first AND circuit, the other clock input being supplied with said direction signal indicative of the outward traverse supplied from said second AND circuit, thereby to count said net number of the guide tracks traversed by the light spot, whereby a track location is determined in accordance with said net number of track guides traversed by the light spot.

2. A track locating apparatus according to claim 1, further including:
   a comparator for comparing said net number of the guide tracks counted by said up-down counter with a predetermined number of tracks to be traversed, thereby to detect that said both number of tracks are coincident with each other.

* * * * *